United States Patent
Funahashi et al.

(10) Patent No.: US 11,521,796 B2
(45) Date of Patent: Dec. 6, 2022

(54) REACTOR AND MANUFACTURING METHOD OF REACTOR

(71) Applicant: TOYOTA JIDOSHA KABUSHIKI KAISHA, Toyota (JP)

(72) Inventors: Kazuki Funahashi, Nagoya (JP); Yasuhiro Ueno, Miyoshi (JP); Yuki Uchida, Nagoya (JP); Naoyuki Takahashi, Toyoake (JP); Yuko Murata, Nagoya (JP); Takafumi Kondo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/181,792

(22) Filed: Feb. 22, 2021

(65) Prior Publication Data
US 2021/0343473 A1 Nov. 4, 2021

(30) Foreign Application Priority Data
Apr. 30, 2020 (JP) .............................. JP2020-080112

(51) Int. Cl.
*H01F 41/04* (2006.01)
*B29C 45/14* (2006.01)
*B29C 33/14* (2006.01)

(52) U.S. Cl.
CPC ............. *H01F 41/04* (2013.01); *B29C 33/14* (2013.01); *B29C 45/14* (2013.01)

(58) Field of Classification Search
CPC ... B29C 33/14; B29C 45/14; B29C 45/14639; Y10T 29/49071; H01F 41/04; H01F 3/10; H01F 3/14; H01F 27/022; H01F 41/005; H01F 41/127; H01F 37/00; H01F 17/04; H01F 27/263
USPC .......................................................... 29/605
See application file for complete search history.

(56) References Cited

U.S. PATENT DOCUMENTS

| | | | |
|---|---|---|---|
| 7,782,168 B2 * | 8/2010 | Nakatsu | H01F 3/14 336/212 |
| 9,679,694 B2 * | 6/2017 | Kitami | H01F 27/325 |
| 2012/0139684 A1 | 6/2012 | Kobayashi et al. | |

FOREIGN PATENT DOCUMENTS

| JP | 2012-119545 A | 6/2012 |
| JP | 2018-082129 A | 5/2018 |

* cited by examiner

*Primary Examiner* — Donghai D Nguyen
(74) *Attorney, Agent, or Firm* — Oblon, McClelland, Maier & Neustadt, L.L.P.

(57) ABSTRACT

A manufacturing method of a reactor includes: a coil mold step of forming a coil mold in which a first resin is molded to cover at least part of a coil; and a main body mold step of forming a main body mold in which a second resin is molded to cover at least part of an assembly body in which the coil, the coil mold, two I-cores, and an O-core surrounding the coil and the coil mold are assembled. In the coil mold step, a gap plate configured to fill a gap between positions where the two I-cores are placed is formed by molding with the first resin. In the main body mold step, gap plates each configured to fill a gap between the O-core and a corresponding one of the I-cores are formed by molding with the second resin.

9 Claims, 10 Drawing Sheets

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

REACTOR AND MANUFACTURING METHOD OF REACTOR

CROSS-REFERENCE TO RELATED APPLICATION

This application claims priority to Japanese Patent Application No. 2020-080112 filed on Apr. 30, 2020, incorporated herein by reference in its entirety.

BACKGROUND

1. Technical Field

The present disclosure relates to a reactor and a manufacturing method of a reactor.

2. Description of Related Art

Japanese Unexamined Patent Application Publication No. 2012-119545 (JP 2012-119545 A) describes that a wraparound property of molding resin inside a case is improved such that an inner bottom face of the case for resin molding is constituted by a plurality of surfaces having two or more different surface heights with a bottom face outside the case being taken as a reference surface, and a bottom end face of a core accommodated inside the case is brought into contact with any of the surfaces constituting the inner bottom face of the case except a surface with a lowest surface height.

Japanese Unexamined Patent Application Publication No. 2018-082129 (JP 2018-082129 A) describes a reactor including two I-shaped I-cores and an O-shaped O-core.

SUMMARY

In the case of a reactor including two I-shaped I-cores and one O-shaped O-core, it is necessary to assemble them with an accurate gap distance between the I-cores and an accurate gap distance between each of the I-cores and the O-core. In order to deal with this problem, the shape described in JP 2012-119545 A is conceivable. However, in a case where the shape described in JP 2012-119545 A is employed, the shape is complicated, and therefore, there is a problem of an increase in cost for manufacture.

The present disclosure is accomplished in order to solve the above problem and is intended to provide a reactor and a manufacturing method of a reactor each of which can reduce manufacturing cost.

A manufacturing method of a reactor according to one aspect of the present disclosure is a manufacturing method of a reactor including a coil, two I-shaped I-cores, and an O-shaped O-core configured to surround the two I-cores. The manufacturing method at least includes: a coil mold step of forming a coil mold in which a first resin is molded to cover at least part of the coil; and a main body mold step of forming a main body mold in which a second resin is molded to cover at least part of an assembly body in which the coil, the coil mold, the two I-cores, and the O-core surrounding the coil and the coil mold are assembled, the two I-cores being placed inside the coil such that the two I-cores are arranged side by side. In the coil mold step, a first gap plate configured to fill a gap between positions where the two I-cores are placed is formed by molding with the first resin. In the main body mold step, second gap plates each configured to fill a gap between the O-core and a corresponding one of the I-cores are formed by molding with the second resin. In such a configuration, in the coil mold step, the first gap plate configured to fill the gap between the positions where the two I-cores are placed is formed by molding with the first resin. This makes it possible to reduce manufacturing cost.

In the manufacturing method, in the main body mold step, a pin may be placed between the O-core and each of the I-cores, and the each of the I-cores may be pressed against the first gap plate by the pin. With such a configuration, it is possible to improve accuracy of the gap between the I-cores, thereby making it possible to improve magnetic performance.

In the manufacturing method, the gap between the two I-cores may correspond to the thickness of the first gap plate in a direction along which the two I-cores are arranged side by side, and the gap between the O-core and each of the I-cores may correspond to the thickness of a corresponding one of the second gap plates in the direction along which the two I-cores are arranged side by side. With such a configuration, it is possible to improve accuracy of the gap between the I-cores, thereby making it possible to improve magnetic performance.

In the manufacturing method, in the main body mold step, the second resin may be injected toward the two I-cores from respective outer sides of the I-cores in a direction along which the I-cores are arranged so that the I-cores are pressed against the first gap plate. With such a configuration, it is possible to improve accuracy of the gap between the I-cores, thereby making it possible to improve magnetic performance.

A reactor according to one aspect of the present disclosure is a reactor including a coil, a coil mold, two I-shaped I-cores, an O-shaped O-core, and a main body mold. In the coil mold, a first resin is molded to cover at least part of the coil. The two I-shaped I-cores are placed inside the coil such that the two I-cores are arranged side by side. The O-shaped O-core is configured to surround the coil and the coil mold. The main body mold is configured such that a second resin is molded to cover at least part of an assembly body in which the coil, the coil mold, the two I-cores, and the O-core are assembled. The coil mold includes a first gap plate formed by molding with the first resin such that the first gap plate fills a gap between the two I-cores. The main body mold includes second gap plates formed by molding with the second resin such that the second gap plates each fill a gap between the O-core and a corresponding one of the I-cores. In such a configuration, the coil mold includes the first gap plate configured to fill the gap between the positions where the two I-cores are placed. This makes it possible to reduce manufacturing cost.

In the reactor, the first gap plate may be formed integrally with the coil mold, and the second gap plate may be formed integrally with the main body mold. With such a configuration, it is possible to reduce manufacturing cost.

In the reactor, a gap between the two I-cores may correspond to the thickness of the first gap plate in a direction along which the two I-cores are arranged side by side. A gap between the O-core and each of the I-cores may correspond to the thickness of a corresponding one of the second gap plates in the direction along which the two I-cores are arranged side by side. With such a configuration, it is possible to improve accuracy of the gap between the I-cores, thereby making it possible to improve magnetic performance.

In the reactor, the first resin and the second resin may contain the same material. With such a configuration, it is possible to reduce manufacturing cost.

In the reactor, each of the I-cores may be surrounded by the coil mold and the main body mold. With such a configuration, it is possible to reduce manufacturing cost.

With one aspect of the present disclosure, it is possible to provide a reactor and a manufacturing method of a reactor each of which can reduce manufacturing cost.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes the present disclosure based on embodiments of the disclosure, but the following description is not intended to limit the disclosure according to Claims to the following embodiments. Further, constituents described in the embodiments are not necessarily essential as the means for solving the problem of the disclosure. The following description and drawings are omitted or simplified appropriately for clarification of the description. In each of the drawings, the same element has the same reference sign, and a redundant description is omitted as needed.

Embodiment 1

A reactor and a manufacturing method of a reactor according to Embodiment 1 will be described below. The reactor is a passive element using a coil and is used for the purpose (e.g., a voltage converter and the like) of restraining a high frequency current, smoothing a direct current, boosting a direct voltage, and so on. The reactor is also referred to as an inductor.

The reactor of the present embodiment may be used for a power converter to be provided in hybrid vehicles and electric vehicles, for example. The hybrid vehicles and the electric vehicles include an alternating current motor such as an induction motor or a PM motor as a drive motor. On this account, these vehicles are provided with a power control unit including a voltage converter circuit configured to increase direct-current power of a battery and an inverter circuit configured to convert direct-current power into alternating-current power suitable for driving of the drive motor. The reactor of the present embodiment may be used for a voltage converter circuit of the power control unit, for example. Note that the purpose of the reactor of the present embodiment is not limited to the power converter to be provided in hybrid vehicles and electric vehicles.

Before a configuration of the reactor according to Embodiment 1 is described, a manufacturing method of a reactor according to a comparative example and problems of the comparative example will be described first. After that, the manufacturing method of the reactor according to the present embodiment will be described in comparison with the comparative example. This will clarify the features of the manufacturing method according to the present embodiment. After that, the reactor according to the present embodiment will be described.

Manufacturing Method of Reactor in Comparative Example

Figure 1:
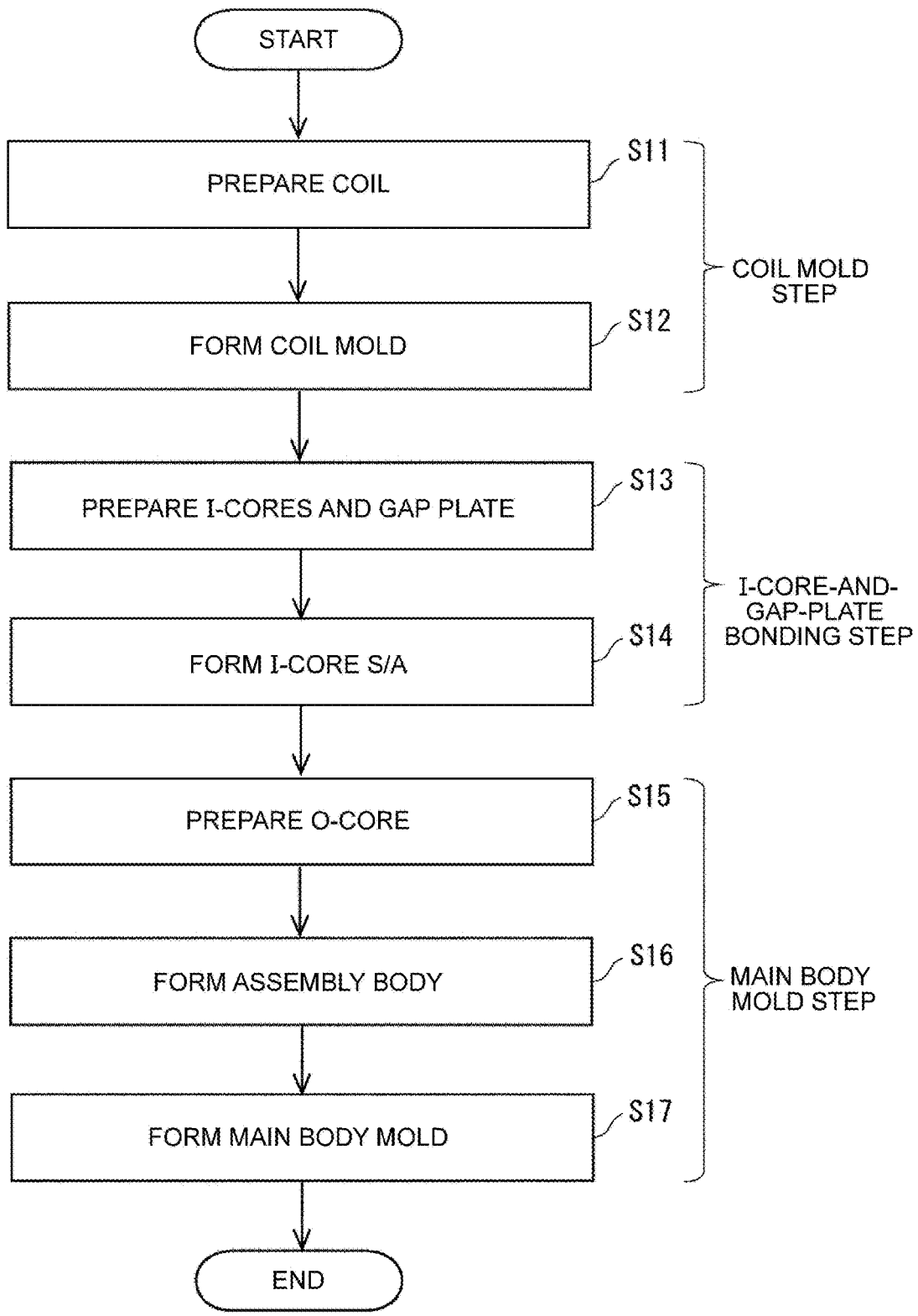
FIG. 1 is a flowchart illustrating a manufacturing method of a reactor according to a comparative example.

FIG. 1 is a flowchart illustrating the manufacturing method according to the comparative example. As illustrated in FIG. 1, the manufacturing method according to the comparative example includes a coil mold step, an I-core-and-gap-plate bonding step, and a main body mold step.

Figure 2:
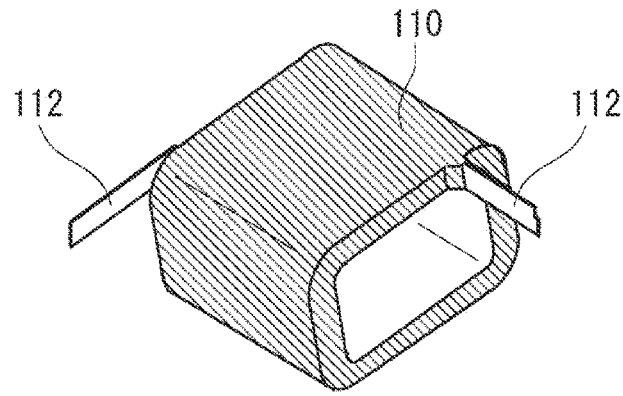
FIG. 2 is a perspective view illustrating a coil in the manufacturing method according to the comparative example.
Figure 3:
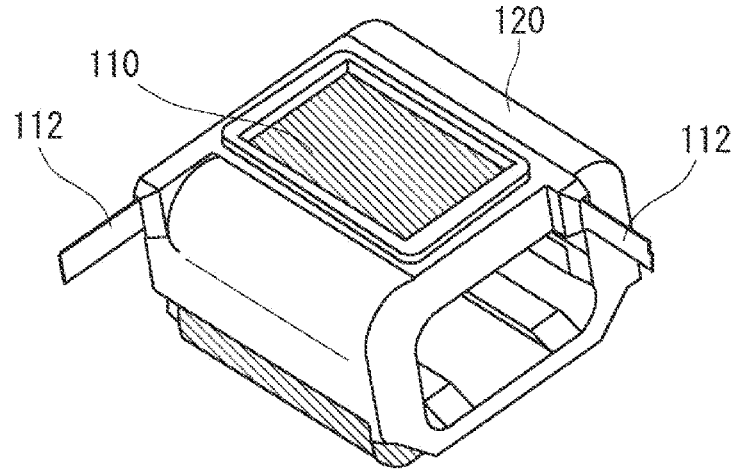
FIG. 3 is a perspective view illustrating a coil mold in the manufacturing method according to the comparative example.

First described is a coil mold step of forming a coil mold. FIG. 2 is a perspective view illustrating a coil in the manufacturing method according to the comparative example. FIG. 3 is a perspective view illustrating the coil mold in the manufacturing method according to the comparative example. Side faces and end faces of a coil 110 are hatched in FIGS. 2, 3 so that the coil 110 can be distinguished from a coil mold 120.

As illustrated in step S11 in FIG. 1 and FIG. 2, the coil 110 is prepared. The coil 110 is configured such that a belt-shaped or linear conductive material is wound in a predetermined shape, for example. The conductive material contains copper, for example, but is not limited to the conductive material containing copper, provided that a current flows through the conductive material. The conductive material is a flat wire, for example. Note that the conductive material is not limited to a flat wire and may be a circular wire having a round section.

The coil 110 has a tubular shape, for example, and a core member or air is placed inside the coil 110. The coil 110 has a rounded-corner tubular shape with round corners, for example, but is not limited to this. The coil 110 may have a rectangular tubular shape, a cylindrical shape, or the like. The coil 110 may include a terminal 112 extending in a predetermined direction.

Subsequently, as illustrated in step S12 in FIG. 1 and FIG. 3, the coil mold 120 is formed. The coil mold 120 is configured such that a resin is molded to cover at least part of the coil 110. The resin to be used can be epoxy resin, silicone resin, and so on, for example, but is not limited to epoxy resin and silicone resin, provided that the resin can be hardened after the resin in a liquid form is injected into a metal mold. Further, the resin may contain a filler.

The coil mold 120 is formed in the following procedure, for example. That is, the coil 110 is placed inside a predetermined metal mold (not shown). The resin is injected into the metal mold in which the coil 110 is placed. Then, the resin is hardened. Hereby, the coil mold 120 can be formed such that the resin is molded to cover at least part of the coil 110. For example, the coil mold 120 annularly covers the coil 110 along peripheral edges at both ends of the coil 110 and also covers outer surfaces and inner surfaces of two side faces facing each other among four side faces of the coil 110.

Figure 4:
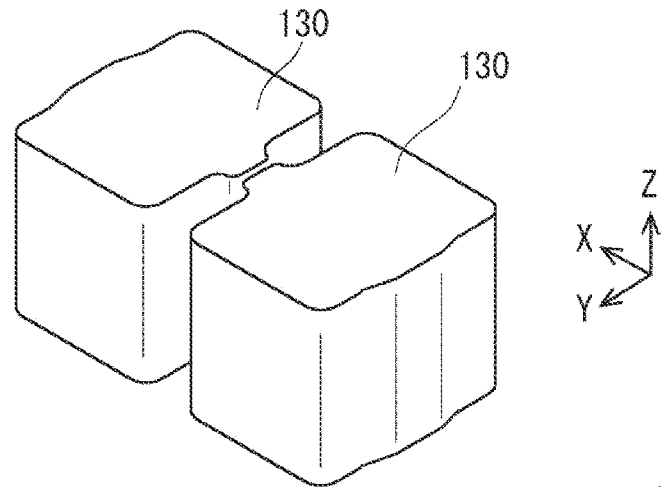
FIG. 4 is a perspective view illustrating two I-cores placed such that the two I-cores are arranged side by side at an interval in the manufacturing method according to the comparative example.
Figure 5:
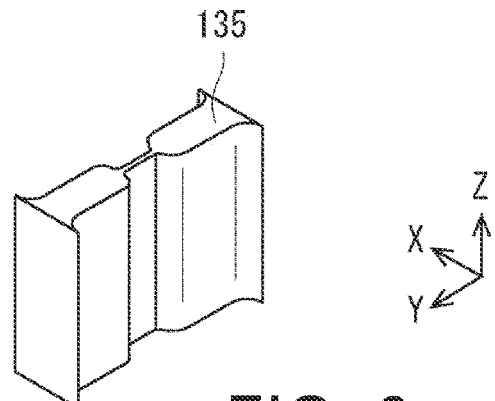
FIG. 5 is a perspective view illustrating a gap plate configured to fill a gap between the I-cores in the manufacturing method according to the comparative example.
Figure 6:
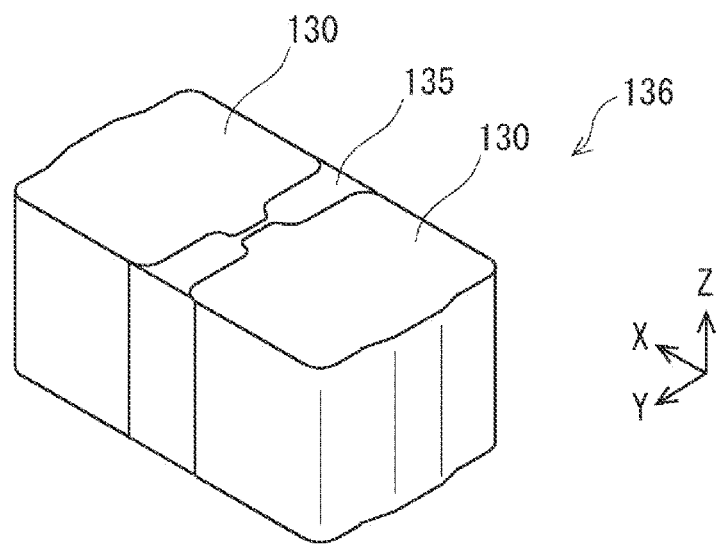
FIG. 6 is a perspective view illustrating an I-core S/A in the manufacturing method according to the comparative example.

Next will be described the I-core-and-gap-plate bonding step of bonding I-cores to a gap plate. FIG. 4 is a perspective view illustrating two I-cores placed such that the two I-cores are arranged side by side at an interval in the manufacturing method according to the comparative example. FIG. 5 is a perspective view illustrating the gap plate configured to fill a gap between the I-cores in the manufacturing method according to the comparative example. FIG. 6 is a perspective view illustrating an I-core S/A in the manufacturing method according to the comparative example.

As illustrated in step S13 in FIG. 1 and FIGS. 4, 5, I-cores 130 and a gap plate 135 are prepared. The I-core 130 is an I-shaped member having a rectangular-solid shape. The I-core 130 is placed inside the coil 110 and controls inductance of the coil 110. The I-core 130 contains a magnetic material that improves the inductance of the coil 110, for example. A plurality of I-cores 130 is placed in the coil 110. For example, two I-cores 130 are placed inside the coil 110 such that the two I-cores 130 are arranged side by side.

Here, for purposes of the description of the manufacturing method of the reactor, an XYZ rectangular coordinate system is introduced. The direction where the two I-cores 130 are arranged side by side is referred to as an X-axis direction. The vertical direction is referred to as a Z-axis direction. A direction perpendicular to the X-axis and the Z-axis is referred to as a Y-axis direction. The XYZ rectangular coordinate system is just for convenience, and the XYZ rectangular coordinate system does not limit directions when an actual reactor is used and also does not limit directions when an actual reactor is manufactured.

The gap plate 135 is a thin plate-shaped member. The gap plate 135 is placed between the two I-cores 130. Accordingly, the thickness of the gap plate 135, that is, the length of the gap plate 135 in the X-axis direction corresponds to a gap between the two I-cores 130. The gap plate 135 is a member configured to fill the gap between the two I-cores 130. The gap plate 135 may contain a resin, for example.

Subsequently, as illustrated in step S14 in FIG. 1 and FIG. 6, an I-core sub-assembly (I-Core Sub-Assy, hereinafter referred to as an I-core S/A 136) is formed. The I-core S/A 136 is formed such that the two I-cores 130 are bonded to each other with the gap plate 135 being sandwiched therebetween in the X-axis direction. Thus, the gap between the two I-cores 130 is filled by the gap plate 135.

Figure 7:
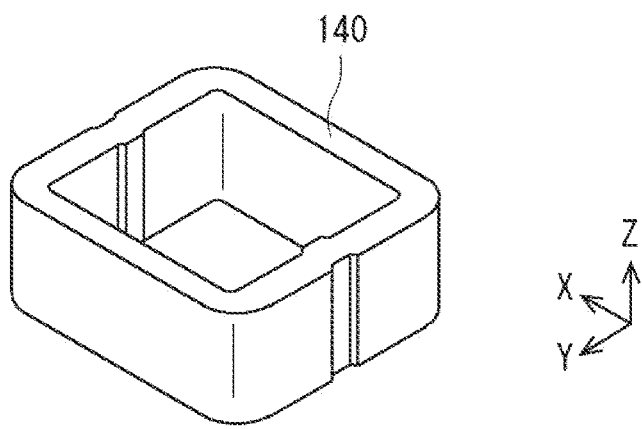
FIG. 7 is a perspective view illustrating an O-core in the manufacturing method according to the comparative example.
Figure 8:
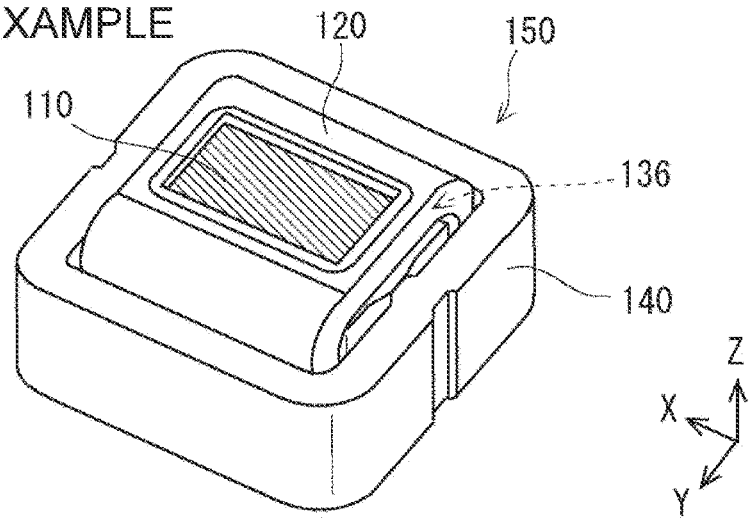
FIG. 8 is a perspective view illustrating an assembly body in which the coil, the coil mold, the I-core S/A, and the O-core are assembled in the manufacturing method according to the comparative example.
Figure 9:
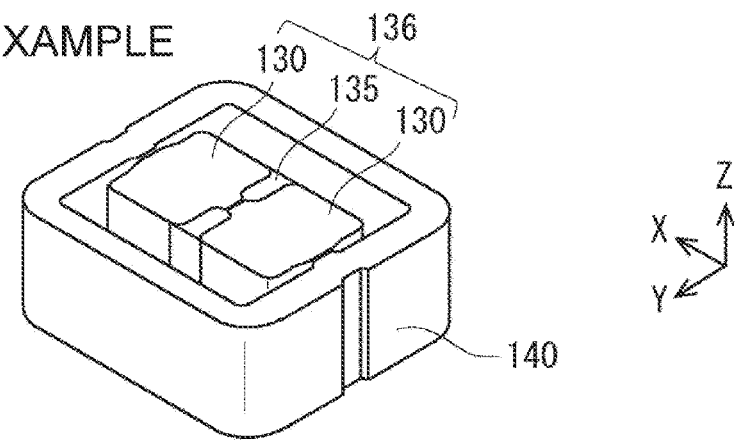
FIG. 9 is a perspective view illustrating the I-core S/A placed inside the O-core in the manufacturing method according to the comparative example.
Figure 10:
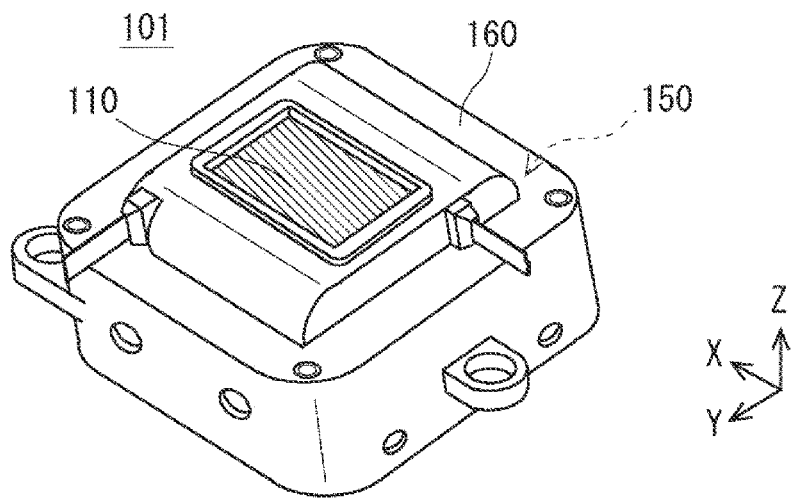
FIG. 10 is a perspective view illustrating the reactor in the manufacturing method according to the comparative example.

Next will be described the main body mold step of forming a main body mold. FIG. 7 is a perspective view illustrating an O-core in the manufacturing method according to the comparative example. FIG. 8 is a perspective view illustrating an assembly body in which the coil, the coil mold, the I-core S/A, and the O-core are assembled in the manufacturing method according to the comparative example. FIG. 9 is a perspective view illustrating the I-core S/A placed inside the O-core in the manufacturing method according to the comparative example. FIG. 10 is a perspective view illustrating the reactor in the manufacturing method according to the comparative example.

As illustrated in step S15 in FIG. 1 and FIG. 7, an O-core 140 is prepared. The O-core 140 is an O-shaped member having a rounded-corner tubular shape, an O-shape, or the like and has a hollow shape. The O-core 140 is a member that can surround the I-core S/A 136 and the coil mold 120. That is, the two I-cores 130 and the coil mold 120 can be placed in a hollow part formed in the O-core 140.

Subsequently, as illustrated in step S16 in FIG. 1 and FIG. 8, an assembly body 150 is formed. The assembly body 150 is configured such that the coil 110, the coil mold 120, the I-core S/A 136, and the O-core 140 are assembled. The coil 110 is placed such that the hollow part extends in the X-axis direction. The coil mold 120 is fastened so as to cover part of the coil 110. The I-core S/A 136 is placed inside the coil 110. The two I-cores 130 in the I-core S/A 136 are arranged side by side in the X-axis direction. The O-core 140 is placed such that its O-shape is observable when the O-core 140 is viewed from the Z-axis direction. The O-core 140 is placed to surround the I-core S/A 136 and the coil mold 120 placed in the hollow part.

As illustrated in FIG. 9, the positional relationship between the I-core S/A 136 and the O-core 140 by omitting the coil 110 and the coil mold 120 is such that the O-core 140 is placed to surround the I-core S/A 136. In the comparative example, the gap between the two I-cores 130 corresponds to the thickness of the gap plate 135.

Subsequently, as illustrated in step S17 in FIG. 1 and FIG. 10, a main body mold 160 is formed. The main body mold 160 is configured such that a resin is molded to cover at least part of the assembly body 150. Similarly to the coil mold 120, the resin to be used herein can be epoxy resin, silicone resin, and so on, for example, but is not limited to epoxy resin and silicone resin, provided that the resin can be hardened after the resin in a liquid form is injected into a metal mold. Further, the resin may contain a filler.

The resin used for the main body mold 160 and the resin used for the coil mold 120 may be made of the same material or may be made of different materials.

The main body mold 160 is formed in the following procedure, for example. That is, the assembly body 150 is placed inside a predetermined metal mold (not shown). The resin is injected into the metal mold in which the assembly body 150 is placed. At the time when the resin is injected, the resin is injected such that the two I-cores 130 are pressed from respective outer sides of the two I-cores 130 in the X-axis direction, for example. Then, the resin is hardened. Hereby, the main body mold 160 can be formed such that the resin is molded to cover at least part of the assembly body 150. The main body mold 160 surrounds the I-core S/A 136 and includes a gap plate placed between the O-core 140 and each of the I-cores 130. Thus, a reactor 101 of the comparative example can be manufactured.

Figure 11:
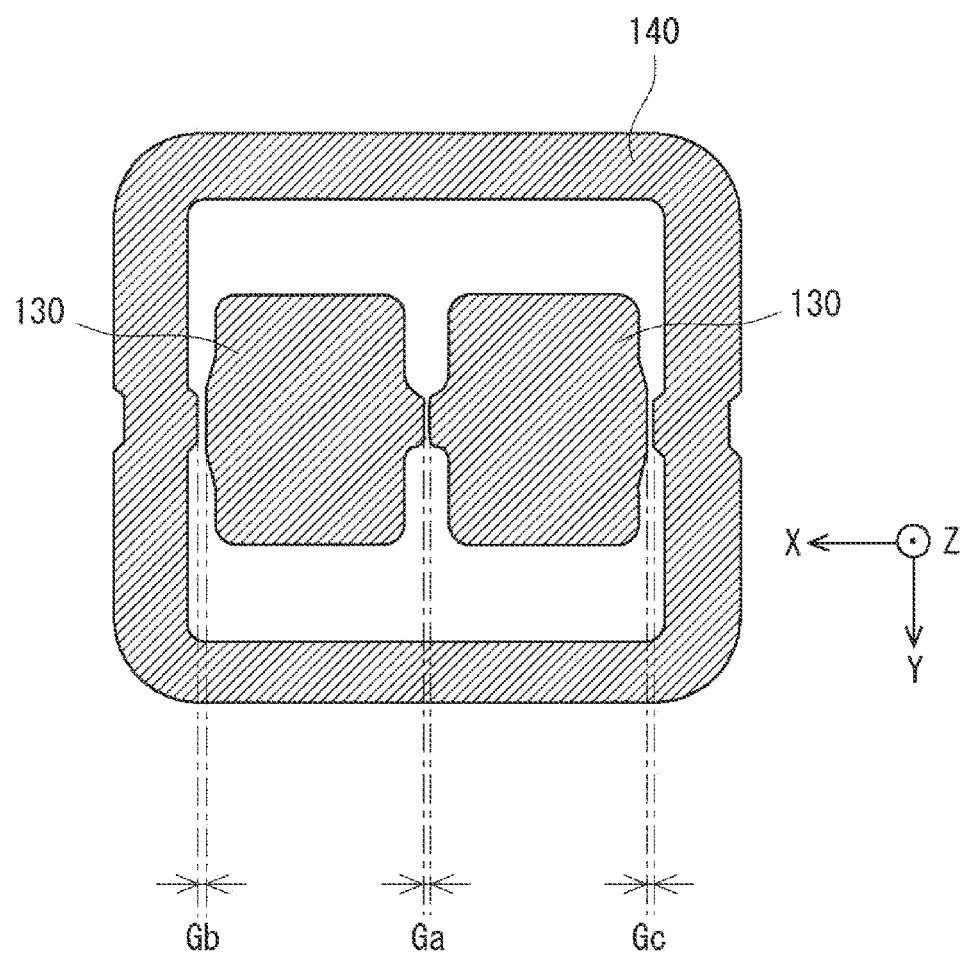
FIG. 11 is a sectional view illustrating the two I-cores placed inside the O-core.

FIG. 11 is a sectional view illustrating the two I-cores 130 placed inside the O-core 140. In FIG. 11, the coil 110, the coil mold 120, the gap plate 135, and the main body mold 160 are omitted.

As illustrated in FIG. 11, a gap Ga is provided between the I-cores 130. A gap Gb is provided between one of the I-cores 130 and the O-core 140, and a gap Gc is provided between the other one of the I-cores 130 and the O-core 140. The gap Ga corresponds to the length between the I-cores 130 in the X-axis direction. Each of the gaps Gb, Gc corresponds to the length between its corresponding one of the I-cores 130 and the O-core 140 in the X-axis direction. To manage the gaps Ga, Gb, Gc to predetermined lengths is indispensable to secure magnetic performance.

In the comparative example, if the two I-cores 130 are placed inside the O-core 140 individually without forming the I-core S/A 136, it is difficult to form the predetermined gap Ga between the two I-cores 130. The reason is as follows. When resins are injected into the metal mold from both outer sides of the metal mold along the X-axis direction, the pressures of the resins thus injected into the metal mold work such that the I-cores 130 push each other, so that the gap Ga between the I-cores 130 becomes zero. In view of this, it is necessary to form the I-core S/A 136 in which the gap plate 135 is sandwiched between the two I-cores 130 in advance, so that the predetermined gap Ga can be formed between the two I-cores 130. Accordingly, in the comparative example, the I-core-and-gap-plate bonding step for forming the I-core S/A 136 is required, and therefore, it is difficult to restrain an increase in manufacturing cost.

Manufacturing Method of Reactor in Present Embodiment

Next will be described a manufacturing method of a reactor in the present embodiment. In the present embodiment, a gap plate configured to fill a gap between two I-cores is formed in a coil mold step.

Figure 12:
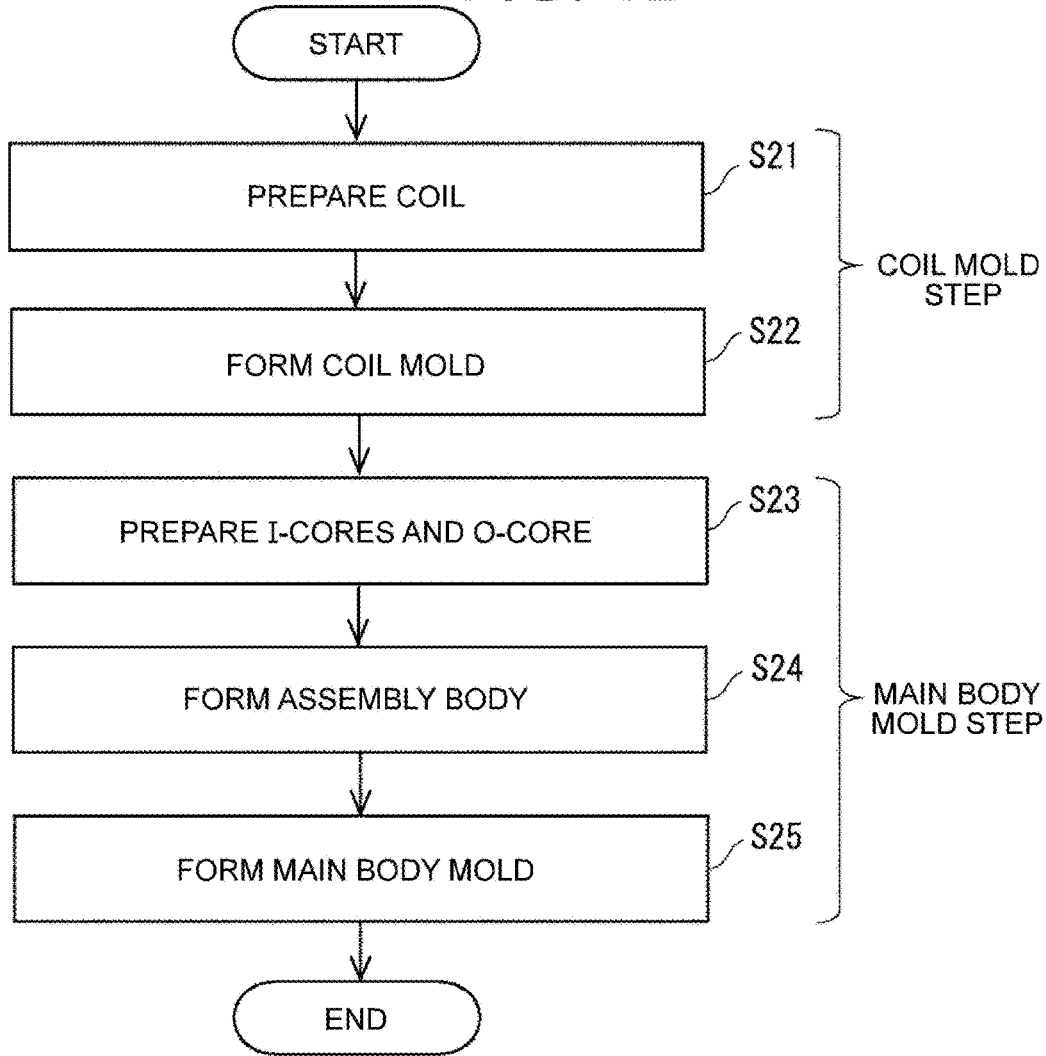
FIG. 12 is a flowchart illustrating a manufacturing method of a reactor according to Embodiment 1.

FIG. 12 is a flowchart illustrating the manufacturing method according to Embodiment 1. As illustrated in FIG. 12, the manufacturing method according to the present embodiment includes a coil mold step and a main body mold step.

Figure 13:
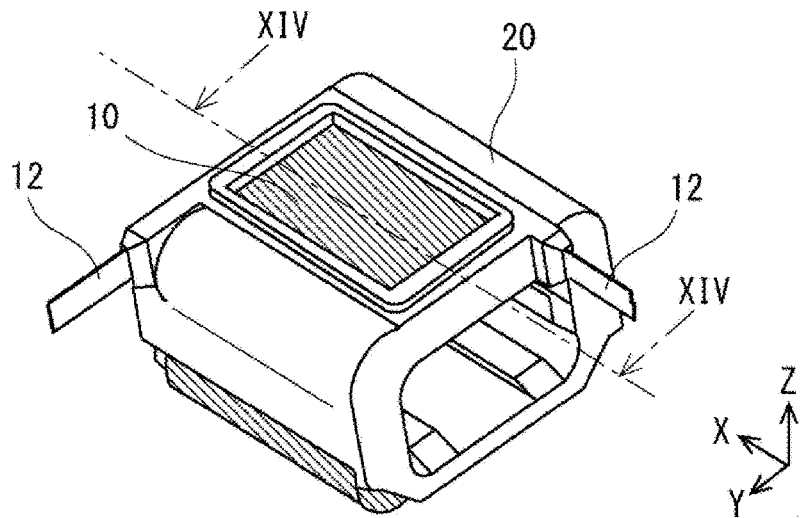
FIG. 13 is a perspective view illustrating a coil mold in the manufacturing method according to Embodiment 1.
Figure 14:
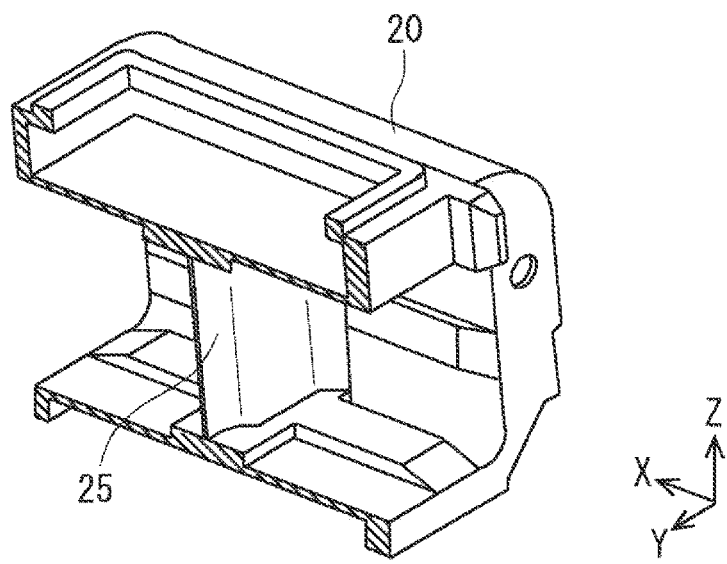
FIG. 14 is a sectional perspective view illustrating the coil mold in the manufacturing method according to Embodiment 1 and illustrates a section taken along a line XIV-XIV in FIG. 13.

First described is the coil mold step of forming a coil mold. FIG. 13 is a perspective view illustrating the coil mold in the manufacturing method according to Embodiment 1. FIG. 14 is a sectional perspective view illustrating the coil mold in the manufacturing method according to Embodiment 1 and illustrates a section taken along a line XIV-XIV in FIG. 13.

As illustrated in step S21 in FIG. 12, a coil 10 is prepared. The coil 10 is similar to the coil 110 in the comparative example. The coil 10 may include a terminal 12.

Subsequently, as illustrated in step S22 in FIG. 12 and FIGS. 13, 14, a coil mold 20 is formed. The coil mold 20 is configured such that a resin is molded to cover at least part of the coil 10. For example, the coil mold 20 annularly covers the coil 10 along peripheral edges at both ends of the coil 10 and also covers outer surfaces and inner surfaces of two side faces facing each other among four side faces of the coil 10. Further, the coil mold 20 includes a gap plate 25 projecting from part covering the inner surfaces of the two side faces of the coil 10. The gap Ga between two I-cores 30 corresponds to the thickness of the gap plate 25 in the X-axis direction.

As such, in the present embodiment, in the coil mold step, the gap plate 25 configured to fill a gap between positions where the two I-cores are placed is formed by molding with the resin. The resin used for the coil mold 20 may be similar to the resin used in the comparative example.

A metal mold used for forming the coil mold 20 of the present embodiment has a shape that is to form the gap plate 25 between the positions where the two I-cores are placed. That is, the resin flows in between the positions where the two I-cores are placed and is hardened.

The procedure to form the coil mold 20 is similar to the procedure in the comparative example. That is, the coil 10 is placed inside the metal mold (not shown). The resin is injected by pressure into the metal mold in which the coil 10 is placed. Then, the resin is hardened. Hereby, the coil mold 20 can be formed such that the resin is molded to cover at least part of the coil 10. At this time, the gap plate 25 is formed integrally with the coil mold 20.

Figure 15:
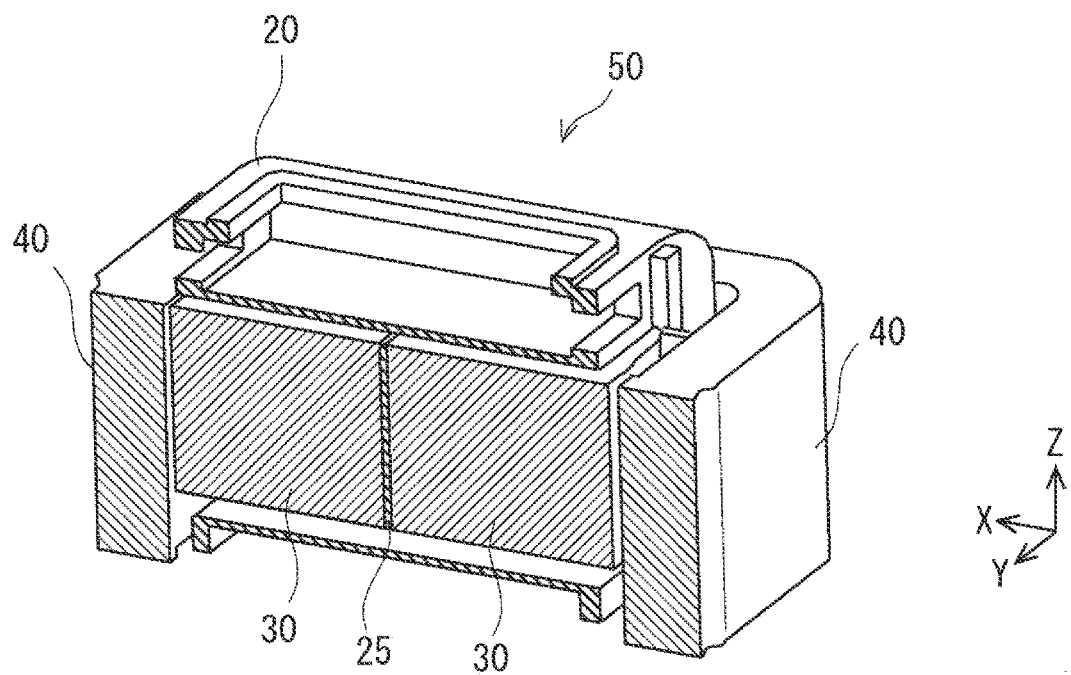
FIG. 15 is a sectional perspective view illustrating an assembly body without a coil in the manufacturing method according to Embodiment 1.
Figure 16:
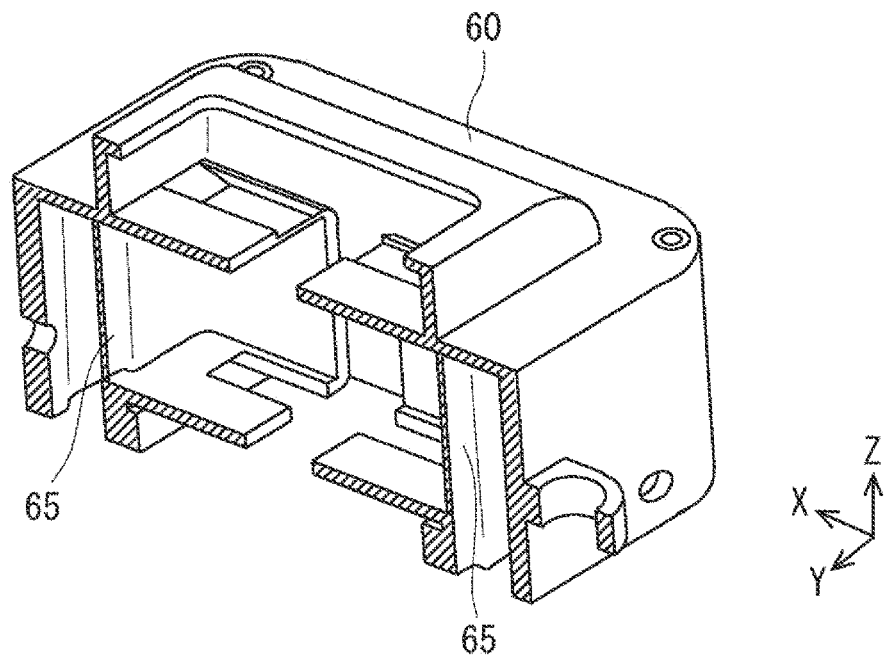
FIG. 16 is a perspective sectional view illustrating a main body mold in the manufacturing method according to Embodiment 1.
Figure 17:
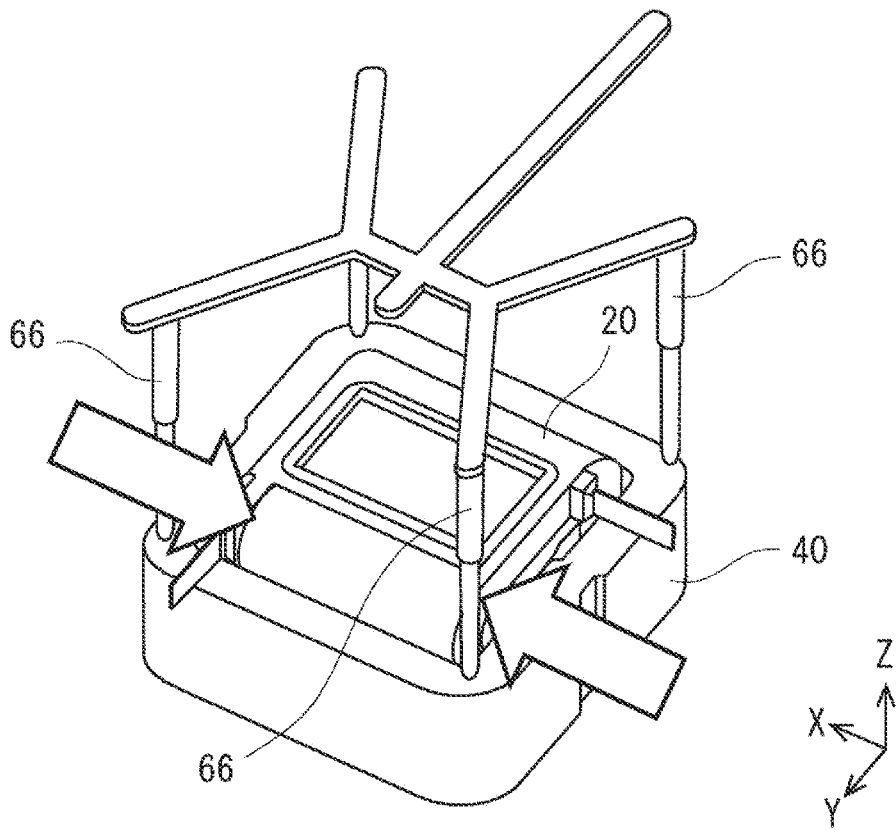
FIG. 17 is a perspective view illustrating a resin injection method in a main body mold step in the manufacturing method according to Embodiment 1.
Figure 18:
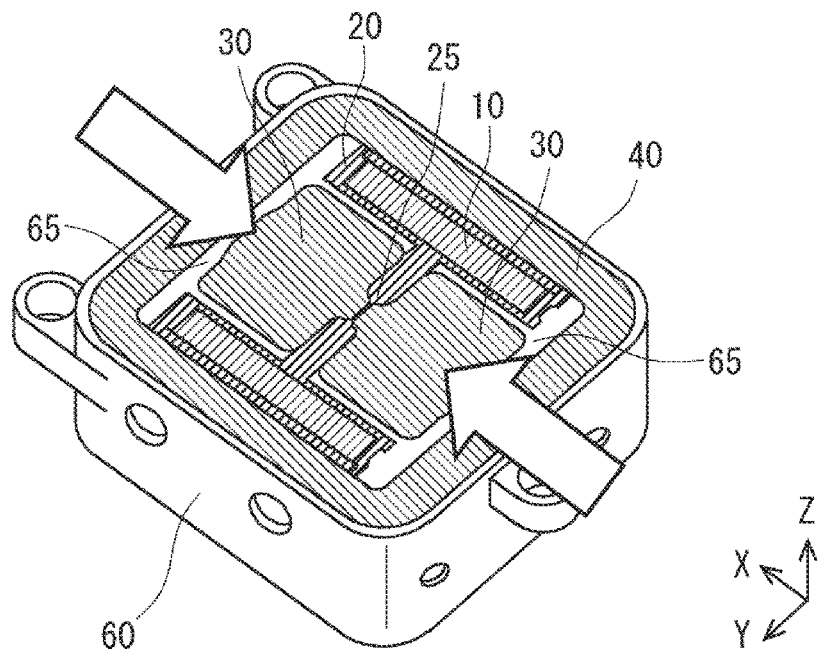
FIG. 18 is a sectional view illustrating the resin injection method in the main body mold step in the manufacturing method according to Embodiment 1.
Figure 19:
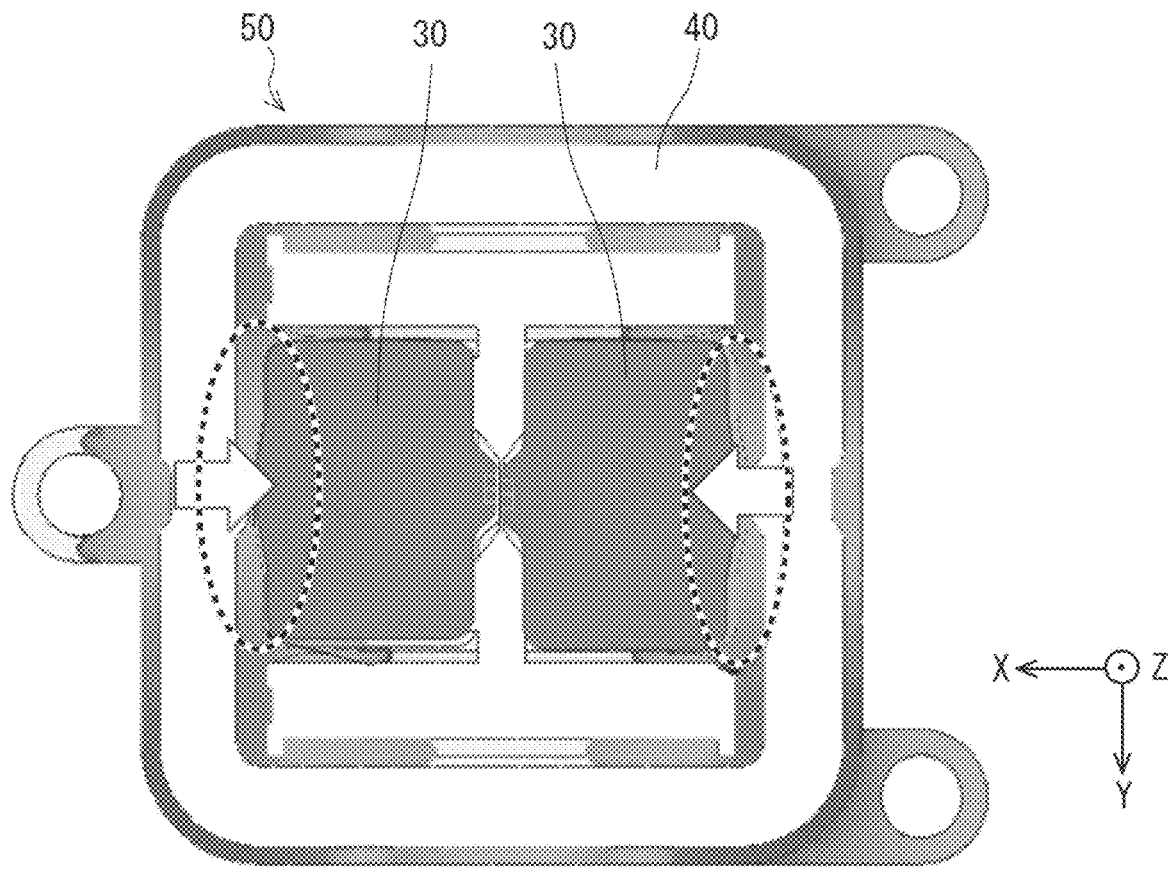
FIG. 19 is a view illustrating a result of a CAE flow analysis at the time when resin is injected into the assembly body in the manufacturing method according to Embodiment 1.
Figure 20:
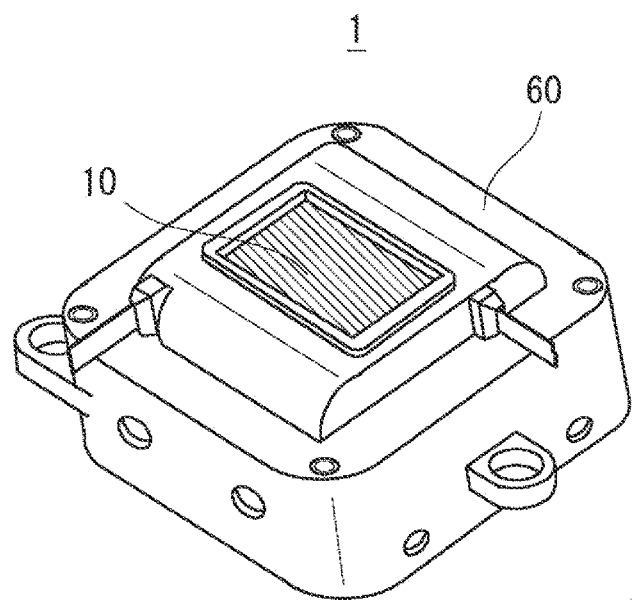
FIG. 20 is a perspective view illustrating the reactor in the manufacturing method according to Embodiment 1.

Next will be described the main body mold step of forming a main body mold. FIG. 15 is a sectional perspective view illustrating the assembly body without the coil in the manufacturing method according to Embodiment 1. FIG. 16 is a perspective sectional view illustrating a main body mold in the manufacturing method according to Embodiment 1. FIG. 17 is a perspective view illustrating a resin injection method in the main body mold step in the manufacturing method according to Embodiment 1. FIG. 18 is a sectional view illustrating the resin injection method in the main body mold step in the manufacturing method according to Embodiment 1. FIG. 19 is a view illustrating a result of a CAE flow analysis at the time when a resin is injected into the assembly body in the manufacturing method according to Embodiment 1. FIG. 20 is a perspective view illustrating the reactor in the manufacturing method according to Embodiment 1. Note that, in FIG. 18, hatching is partially omitted so as to avoid the figure from being complicated.

As illustrated in step S23 in FIG. 12, the I-cores 30 and an O-core 40 are prepared. The I-cores 30 and the O-core 40 are similar to the I-cores 130 and the O-core 140 in the comparative example.

Subsequently, as illustrated in step S24 in FIG. 12, an assembly body 50 is formed. The assembly body 50 is configured such that the coil 10, the coil mold 20, the I-cores 30, and the O-core 40 are assembled. As illustrated in FIG. 15, the assembly body 50 without the coil 10 includes the coil mold 20, the two I-cores 30, and the O-core 40. In the assembly body 50, the coil mold 20 is fastened so as to cover part of the coil 10. Further, the coil mold 20 includes the gap plate 25. A gap between the I-cores 30 is defined by the gap plate 25. The two I-cores 30 are placed such that the two I-cores 30 are arranged side by side inside the coil 10. The O-core 40 is placed to surround the coil 10 and the coil mold 20.

Subsequently, as illustrated in step S25 in FIG. 12 and FIG. 16, a main body mold 60 is formed. The main body mold 60 is configured such that a resin is molded to cover at least part of the assembly body 50. For example, the main body mold 60 covers an outer surface of the coil mold 20 and covers an outer surface of the O-core 40. Further, the main body mold 60 covers outer surfaces of the I-cores 30 and covers an inner surface of the O-core 40. Furthermore, the main body mold 60 includes gap plates 65 each configured to fill a gap between the O-core 40 and a corresponding one of the I-cores 30. Each of the gap plates 65 corresponds to the same thickness as the gap between the O-core 40 and its corresponding one of the I-cores 30 in the X-axis direction.

As such, in the main body mold step in the present embodiment, the gap plates 65 each configured to fill the gap between the O-core 40 and its corresponding one of the I-cores 30 are formed by molding with the resin. The resin used for the main body mold 60 may be similar to the resin used for the coil mold 20. The resin used for the main body mold 60 and the resin used for the coil mold 20 may contain the same material.

A metal mold used to form the main body mold 60 in the present embodiment has a shape by which the gap plates 65 each configured to fill the gap between the O-core 40 and its corresponding one of the I-cores 30 are formed. That is, the resin flows in between the O-core 40 and each of the I-cores 30 and is hardened.

The main body mold 60 is formed in the following procedure, for example. That is, the assembly body 50 is placed inside the metal mold (not shown). The resin is injected into the metal mold in which the assembly body 50 is placed. At the time when the resin is injected, the resin is injected from four corners of the assembly body 50 through filling pipes 66, as illustrated in FIG. 17, for example. The resin then flows from the four corners along the side faces and the inner surface of the O-core 40. Hereby, the gap between the O-core 40 and each of the I-cores 30 is filled. As illustrated in FIGS. 17 and 18, the resin thus injected into the assembly body 50 is injected into the assembly body 50 from both outer sides of the assembly body 50 along the X-axis direction along which the two I-cores 30 are arranged. This is also shown by an analysis result in FIG. 19.

As illustrated in FIG. 19, according to a computer-aided engineering (CAE) flow analysis at the time when the resin is injected into the assembly body 50, the resin thus injected reaches outer sides of the assembly body 50 earlier than a central part of the assembly body 50. Accordingly, the resin thus injected causes forces that push the two I-cores 30 from outside to inside in the X-axis direction. Thus, the resin presses the I-cores 30 against the gap plate 25, so that the gap Ga between the I-cores 30 can be defined by the thickness of the gap plate 25.

Then, the resin thus injected into the assembly body 50 is hardened. Hereby, the main body mold 60 can be formed such that the resin is molded to cover at least part of the assembly body 50. In this step, the gap plates 65 are formed integrally with the main body mold 60. Thus, as illustrated in FIG. 20, the reactor 1 of the present embodiment can be manufactured.

Configuration of Reactor in Present Embodiment

Next will be described a configuration of the reactor according to the present embodiment. As illustrated in FIGS. 18 and 20, the reactor 1 according to the present embodiment includes the coil 10, the coil mold 20, the two I-cores 30, the O-core 40, and the main body mold 60. The coil mold 20 is a member configured such that a resin is molded to cover at least part of the coil 10. The I-cores 30 are placed such that the I-cores 30 are arranged side by side inside the coil 10. The O-core 40 is placed to surround the coil 10 and the coil mold 20. The main body mold 60 is a member configured such that a resin is molded to cover at least part of the assembly body 50 in which the coil 10, the coil mold 20, the two I-cores 30, and the O-core 40 are assembled.

Further, the coil mold 20 includes the gap plate 25 formed by molding with the resin such that the gap plate 25 fills the gap between the two I-cores 30. Thus, the gap plate 25 is formed integrally with the coil mold 20. That is, the gap plate 25 is seamlessly connected to the coil mold 20. The gap plate 25 defines the length of the gap Ga. Here, the gap Ga corresponds to the thickness of the gap plate 25 in a direction along which the two I-cores 30 are arranged side by side.

The main body mold 60 includes the gap plates 65 formed by molding with the resin such that the gap plates 65 each fill the gap between the O-core 40 and a corresponding one of the I-cores 30. Thus, the gap plates 65 are formed integrally with the main body mold 60. That is, the gap plates 65 are seamlessly connected to the main body mold 60. The gap plates 65 define the gaps Gb, Gc. Here, the gaps Gb, Gc correspond to respective thicknesses of the gap plates 65 in the X-axis direction.

Next will be described effects of the reactor 1 and the manufacturing method of the reactor 1 according to the present embodiment. In the present embodiment, in the coil mold step, the gap plate 25 that secures the gap Ga between the I-cores 30 is formed at the same time as the coil mold 20. Accordingly, the I-core-and-gap-plate bonding step in the comparative example can be omitted. This makes it possible to reduce manufacturing cost.

Further, in the main body mold step, the I-cores 30 can be pressed against the gap plate 25 of the coil mold 20 by the injection pressure of the resin. This makes it possible to improve accuracy in the length of the gap Ga.

Further, in the main body mold step, the I-cores 30 are pressed against the gap plate 25 of the coil mold 20 by the injection pressure of the resin, and hereby, the positions of the I-cores 30 are fixed. This accordingly makes it possible to improve accuracy in the gaps Gb, Gc between the O-core 40 and the I-cores 30.

Since the gap plates 25, 65 defining respective lengths of the gaps Ga, Gb, Gc can be formed integrally with the coil mold 20 and the main body mold 60 as such, it is possible to reduce manufacturing cost. Further, since it is possible to improve accuracy in the lengths of the gaps Ga, Gb, Gc, it is possible to improve magnetic performance of the reactor 1.

In terms of the structure of the reactor 1 for an inverter, in order to deal with a high current so as to secure inductance in a high current range, multilayered gaps are required to restrain leakage loss. If the positions of the I-cores 30 inside the coil 10 cannot be fixed at the time when the resin is injected, it is difficult to manage the gap Ga between the I-cores 30.

In the comparative example, the gap Ga between the I-cores 130 is managed by bonding the gap plate 135 made of resin between the I-cores 130. Such a comparative example requires the I-core-and-gap-plate bonding step, and therefore, it is difficult to reduce manufacturing cost.

In contrast, in the present embodiment, the gaps Ga, Gb, Gc are managed by two steps of the coil mold step and the main body mold step. Accordingly, the I-core-and-gap-plate bonding step can be omitted, thereby making it possible to reduce manufacturing cost.

Embodiment 2

Figure 21:
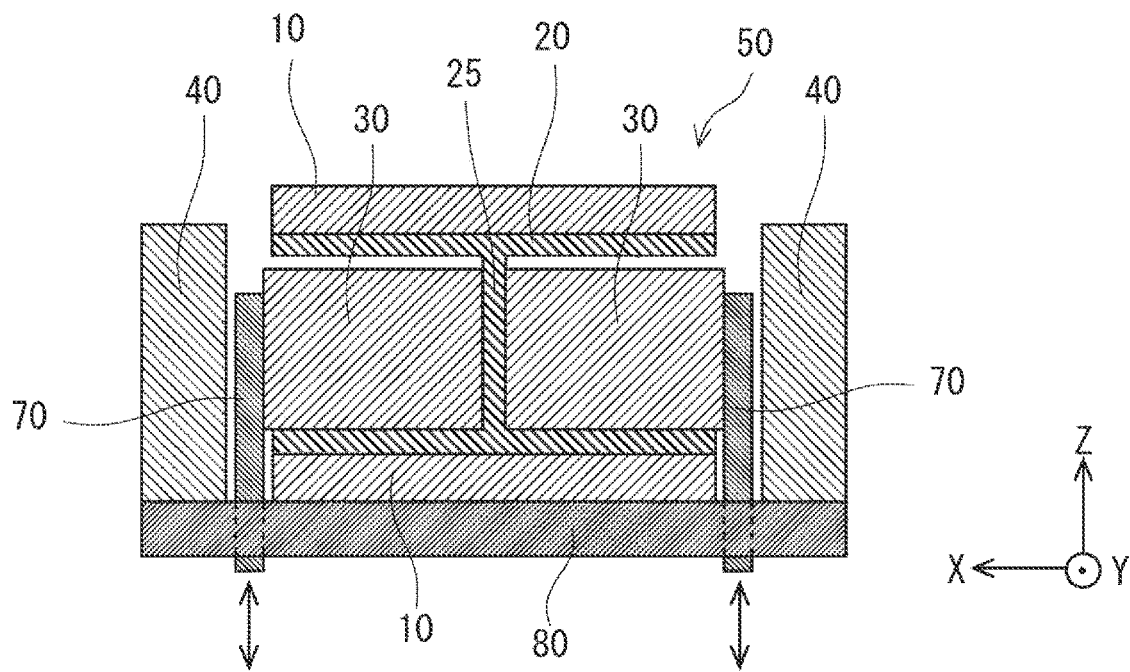
FIG. 21 is a sectional view illustrating a pin inserted between each I-core and an O-core in a manufacturing method of a reactor according to Embodiment 2.

Next will be described a reactor and a manufacturing method of a reactor according to Embodiment 2. FIG. 21 is a sectional view illustrating a pin inserted between each I-core and the O-core in the manufacturing method according to Embodiment 2.

As illustrated in FIG. 21, in the present embodiment, in the main body mold step, a pin 70 is placed between the O-core 40 and each of the I-cores 30 in the assembly body 50 placed inside a metal mold 80. The pin 70 is movable. The each of the I-cores 30 is pressed against the gap plate 25 by the pin 70. In this state, a resin is injected by pressure into the assembly body 50, so that the main body mold 60 is formed.

Then, the resin is hardened. The pin 70 is pulled out at an appropriate timing during hardening of the resin. Hereby, the main body mold 60 can be formed such that the resin is molded to cover at least part of the assembly body 50. Steps other than this are similar to the steps in the manufacturing method of Embodiment 1. Thus, the reactor of the present embodiment can be manufactured.

With the manufacturing method according to the present embodiment, since each of the I-cores 30 is pressed against the gap plate 25 by the pin 70 in the main body mold step, it is possible to improve accuracy of the gap Ga between the I-cores 30. This makes it possible to improve magnetic performance of the reactor. Further, even in a case where the injection pressure of the resin is reduced, for example, it is possible to improve the accuracy of the gap Ga. This accordingly makes it possible to improve a degree of freedom in resin injection conditions in the main body mold step. Configurations and effects other than this are included in the description of Embodiment 1.

Note that the present disclosure is not limited to the above embodiments, and various modifications can be made within a range that does not deviate from the gist of the present disclosure. For example, an embodiment in combination of respective configurations of Embodiments 1 and 2 is also included in the range of a technical idea of the present disclosure.

What is claimed is:

1. A manufacturing method of a reactor including a coil, two I-shaped I-cores, and an O-shaped O-core configured to surround the two I-cores, the manufacturing method at least comprising:
   a coil mold step of forming a coil mold in which a first resin is molded to cover at least part of the coil; and
   a main body mold step of forming a main body mold in which a second resin is molded to cover at least part of an assembly body in which the coil, the coil mold, the two I-cores, and the O-core surrounding the coil and the coil mold are assembled, the two I-cores being placed inside the coil such that the two I-cores are arranged side by side, wherein:
   in the coil mold step, a first gap plate configured to fill a gap between positions where the two I-cores are placed is formed by molding with the first resin; and
   in the main body mold step, second gap plates each configured to fill a gap between the O-core and a corresponding one of the I-cores are formed by molding with the second resin.

2. The manufacturing method according to claim 1, wherein, in the main body mold step, a pin is placed between the O-core and each of the I-cores, and the each of the I-cores is pressed against the first gap plate by the pin.

3. The manufacturing method according to claim 1, wherein:
   a gap between the two I-cores corresponds to a thickness of the first gap plate in a direction along which the two I-cores are arranged side by side; and
   a gap between the O-core and each of the I-cores corresponds to a thickness of a corresponding one of the second gap plates in the direction along which the two I-cores are arranged side by side.

4. The manufacturing method according to claim 1, wherein, in the main body mold step, the second resin is injected toward the two I-cores from respective outer sides of the I-cores in a direction along which the I-cores are arranged so that the I-cores are pressed against the first gap plate.

5. A reactor comprising:
   a coil;
   a coil mold in which a first resin is molded to cover at least part of the coil;
   two I-shaped I-cores placed inside the coil such that the two I-cores are arranged side by side;
   an O-shaped O-core configured to surround the coil and the coil mold; and
   a main body mold configured such that a second resin is molded to cover at least part of an assembly body in which the coil, the coil mold, the two I-cores, and the O-core are assembled, wherein:
   the coil mold includes a first gap plate formed by molding with the first resin such that the first gap plate fills a gap between the two I-cores; and
   the main body mold includes second gap plates formed by molding with the second resin such that the second gap plates each fill a gap between the O-core and a corresponding one of the I-cores.

6. The reactor according to claim 5, wherein:
   the first gap plate is formed integrally with the coil mold; and
   the second gap plate is formed integrally with the main body mold.

7. The reactor according to claim 5, wherein:
   a gap between the two I-cores corresponds to a thickness of the first gap plate in a direction along which the two I-cores are arranged side by side; and
   a gap between the O-core and each of the I-cores corresponds to a thickness of a corresponding one of the second gap plates in the direction along which the two I-cores are arranged side by side.

8. The reactor according to claim 5, wherein the first resin and the second resin contain the same material.

9. The reactor according to claim 5, wherein each of the I-cores is surrounded by the coil mold and the main body mold.

* * * * *